No. 759,232.                                                                                                      Patented May 10, 1904.

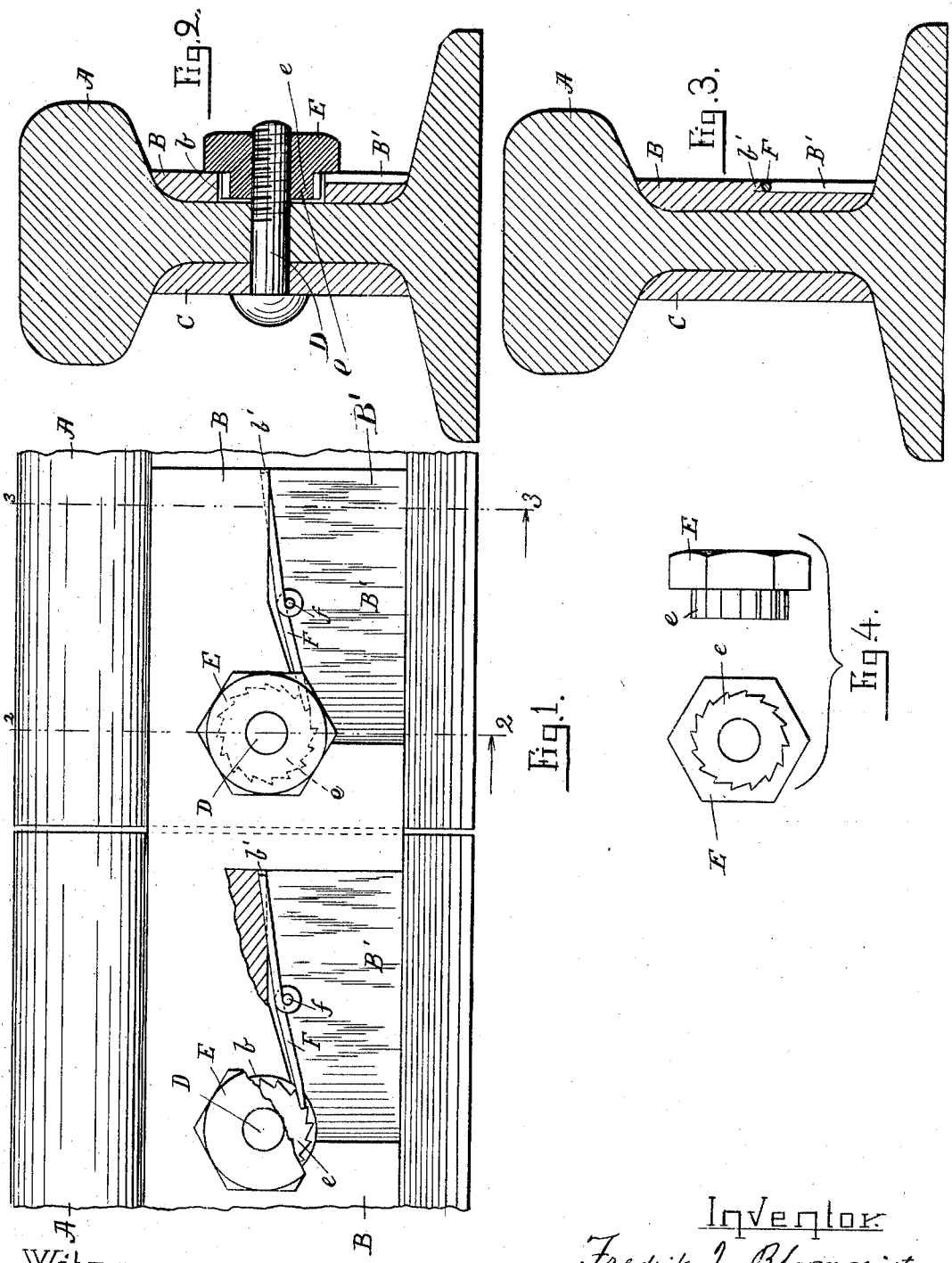

UNITED STATES PATENT OFFICE.

FREDRIK J. BLOOMQVIST, OF CONEMAUGH, PENNSYLVANIA, ASSIGNOR OF THREE-FOURTHS TO LEWIS BERNHIMER, ELLSWORTH BERNHIMER, AND EDWARD DAHLSTROM, OF CONEMAUGH, PENNSYLVANIA.

NUT-LOCK.

SPECIFICATION forming part of Letters Patent No. 759,232, dated May 10, 1904.

Application filed March 15, 1904. Serial No. 198,186. (No model.)

*To all whom it may concern:*

Be it known that I, FREDRIK J. BLOOMQVIST, a citizen of the United States, and a resident of Conemaugh, in the county of Cambria and State of Pennsylvania, have invented certain new and useful Improvements in Nut-Locks, of which the following is a specification.

This invention relates to improvements in nut-locks especially adapted for use on rails for securing thereto the fish-plates and preventing the nut from working loose by the passing of cars on the rails, as will hereinafter be more fully shown and described, reference being had to the accompanying drawings, wherein—

Figure 1 is a side elevation of my invention, showing a portion of one of the nuts broken away and a portion of the fish-plate in section for the better illustration of the device. Fig. 2 is a cross-section on the line 2 2 shown in Fig. 1. Fig. 3 is a cross-section on the line 3 3 shown in Fig. 1, and Fig. 4 represents in end and side elevation one of the ratchet-nuts for securing the fish-plates to the adjacent ends of the rails.

Similar letters refer to similar parts wherever they occur on the different parts of the drawings.

In the drawings, A A represent adjacent ends of rails of any suitable sectional shape, and B C represent the fish-plates located on the opposite sides of the web of the rail at the rail-joint, as shown. The fish-plate C is of the usual construction and perforated for receiving the headed bolt D, that passes loosely through the said fish-plate and a corresponding perforation in the web of the rail, as usual. The fish-plate B is provided at intervals with enlarged perforations $b$, arranged in alinement with the bolt D, as shown. The bolt D is screw-threaded in its opposite end and provided with a nut E, engaging the said screw-threaded portion of the bolt, and provided on its under side with a serrated or ratchet hub $e$, projecting loosely through the perforation $b$ in the fish-plate B, as shown. Below the said perforation $b$ is made a recess or cut-away portion B' in the face of the fish-plate B, as shown, and in such recess is pivoted upon a pin $f$, secured to the fish-plate, a yielding pawl or spring-wire F, the free end of which is held in engagement with the serrated hub $e$ and having its outer end received and resting in a groove or recess $b'$ in the face of the fish-plate B, as shown in Figs. 1 and 3.

In using the device for securing the fish-plates to the rail ends I place the fish-plates on opposite sides of the web of the rails and put the bolt D through the perforations in the fish-plate C, rail-web, and enlarged perforation $b$ in the fish-plate B. I then screw the nut E onto the screw-threaded end of the bolt D, causing the ratchet-hub $e$ to engage the free end of the spring-pawl F and the fish-plates to be secured against opposite sides of the rail-web by said nut when tightened, and when so secured together the nut is prevented from working loose from the bolt by the engagement of the pawl F with the ratchet $e$, as shown. If it is desired to remove the nut, it is only necessary to disengage the free end of the pawl F from the ratchet $e$ by the use of a jackknife or other suitable tool, by means of which the pawl end can readily be forced away from the ratchet, after which the nut can be screwed off from the bolt.

Although especially well adapted for use on fish-plates for securing rails together, the device may equally well be used for the purpose of securing adjacent parts together—such as, for instance, bridge beams, girders, &c.—or for other purposes to which it may be applicable.

Having thus fully described the nature, construction, and operation of my invention, I wish to secure by Letters Patent and claim—

The herein-described nut-lock device consisting of a screw-threaded fastening-bolt, a perforated plate, a nut having a serrated or ratchet hub, a yielding pawl pivoted to said plate, the latter having a recess for receiving and holding the outer end of said pawl in position relative to the plate as and for the purpose set forth.

In testimony whereof I have affixed my signature in presence of two witnesses.

FREDRIK J. BLOOMQVIST.

Witnesses:
M. H. BASH,
B. F. TIERNEY.